United States Patent [19]

McNeely

[11] Patent Number: 5,027,852
[45] Date of Patent: Jul. 2, 1991

[54] PILOT VALVE FOR CONTROL VALVES AND METHOD OF OPERATION

[75] Inventor: Michael D. McNeely, Katy, Tex.

[73] Assignee: Keystone International Holdings Corp.

[21] Appl. No.: 532,807

[22] Filed: Jun. 4, 1990

[51] Int. Cl.[5] ............................................. G05D 16/06
[52] U.S. Cl. .................................. 137/488; 137/627.5; 137/596.18
[58] Field of Search .................. 137/1, 14, 488, 627.5, 137/596.18

[56] References Cited

U.S. PATENT DOCUMENTS

| | | | |
|---|---|---|---|
| 3,730,214 | 5/1973 | Brumm | 137/488 |
| 4,609,008 | 9/1986 | Anderson | |
| 4,791,955 | 12/1988 | Reip | 137/488 |
| 4,875,502 | 10/1989 | Romano | 137/488 X |
| 4,917,144 | 4/1990 | Giles | 137/488 |

*Primary Examiner*—Alan Cohan
*Attorney, Agent, or Firm*—Dodge, Bush, Moseley & Riddle

[57] ABSTRACT

A pilot valve (40) for a control valve (14) has a separate auxiliary source of high pressure fluid (106) for the operation of the pilot valve (40). The dome chamber (36) of the control valve (14), the inlet fluid chamber (72), and the intermediate fluid chamber (104) are exposed only to the auxiliary source of fluid (106). Thus, process fluid from the sensing line (62) does not contaminate the spool valve (76) or the dome chamber (36).

4 Claims, 2 Drawing Sheets

PILOT VALVE FOR CONTROL VALVES AND METHOD OF OPERATION

BACKGROUND OF THE INVENTION

This invention relates to a pilot valve for a control valve in a main flow line, and more particularly to such a pilot valve and method of operation utilizing a fluid source separate from the process fluid in the main flow line.

Heretofore, it has been common to utilize only the process fluid in the main flow line being sensed for the operation of the pilot valve for the main control valve. Oftentimes, the process fluid in the main flow line contains foreign matter which may clog or restrict flow passages, and bind or space opposed sealing and sliding surfaces. While pilot valves may be successfully used in such applications, an adequate maintenance and cleaning of the pilot valve is required in order to ensure that the pilot valve is fully functional. Continuous and frequent maintenance of such pilot valves is an undesirable feature.

SUMMARY OF THE INVENTION

The present invention is directed to a pilot valve for a control valve in a main flow line in which the process fluid in the flow line is sensed by the pilot valve but is isolated from critical working parts of the pilot valve and the associated main control valve including the flow passages, the seating and sealing surfaces of the pilot valve, and the dome chamber of the main valve. A separate auxiliary source of a clean fluid, such as a high pressure gas, is utilized for contact with the dome chamber of the main valve and the seating and sealing surfaces of the pilot valve thereby exposing such critical operating members only to a clean dry gas. A fluid pressure regulator is provided for the pressurized gas source to supply gas at a predetermined constant fluid pressure to the pilot valve.

The pilot valve has a fluid inlet sensing chamber in fluid communication with process fluid from the main flow line, and a separate fluid inlet supply chamber in fluid communication with a separate auxiliary pressurized fluid source isolated from the process fluid. An intermediate fluid chamber in fluid communication with the dome chamber in the control valve is adapted to be in selective fluid communication with the fluid inlet supply chamber for the supply of fluid to the dome chamber upon the reaching of a predetermined low fluid pressure in the process fluid as sensed in the sensing chamber. The intermediate fluid chamber is also adapted to be in selective fluid communication to atmosphere for the release of fluid from the dome chamber upon the reaching of a predetermined high fluid pressure in the process fluid as sensed in the sensing chamber. Suitable valving or valve means responsive to the process fluid pressure in the sensing chamber is provided for selectively placing the intermediate chamber in fluid communication with the fluid inlet supply chamber containing the auxiliary fluid at a predetermined low fluid pressure in the process fluid, and for selectively placing the intermediate chamber in fluid communication with an exhaust chamber at a predetermined high fluid pressure in the process fluid. The process fluid and the auxiliary fluid source remain isolated from each other during the entire operation of the pilot valve.

It is an object of the invention to provide a pilot valve for a control valve in which the sensed process fluid is isolated from the dome chamber of the control valve and the seating and sealing surfaces of the pilot valve.

It is another object of the present invention to provide a pilot valve for a control valve in a main flow line with the pilot valve having an inlet sensing chamber for sensing the process fluid in the main flow line and a separate auxiliary fluid inlet supply chamber having a separate auxiliary fluid for operation of the pilot valve.

It is an additional object of the invention to provide an improved method of operation of a pilot valve by utilizing a separate auxiliary source of fluid sensing the process fluid in the main flow line and having a separate auxiliary fluid for operation of the pilot valve.

A further object of the invention is to provide such a pilot valve for a control valve in which an auxiliary pressurized gas source separate from the sensed process fluid is supplied to the pilot valve at a predetermined constant pressure for operation thereof and is in selective fluid communication with the dome chamber of the control valve.

Other objects, advantages, and features of the invention will become more apparent after referring to the following specification and drawings.

DESCRIPTION OF THE INVENTION

Figure 1:
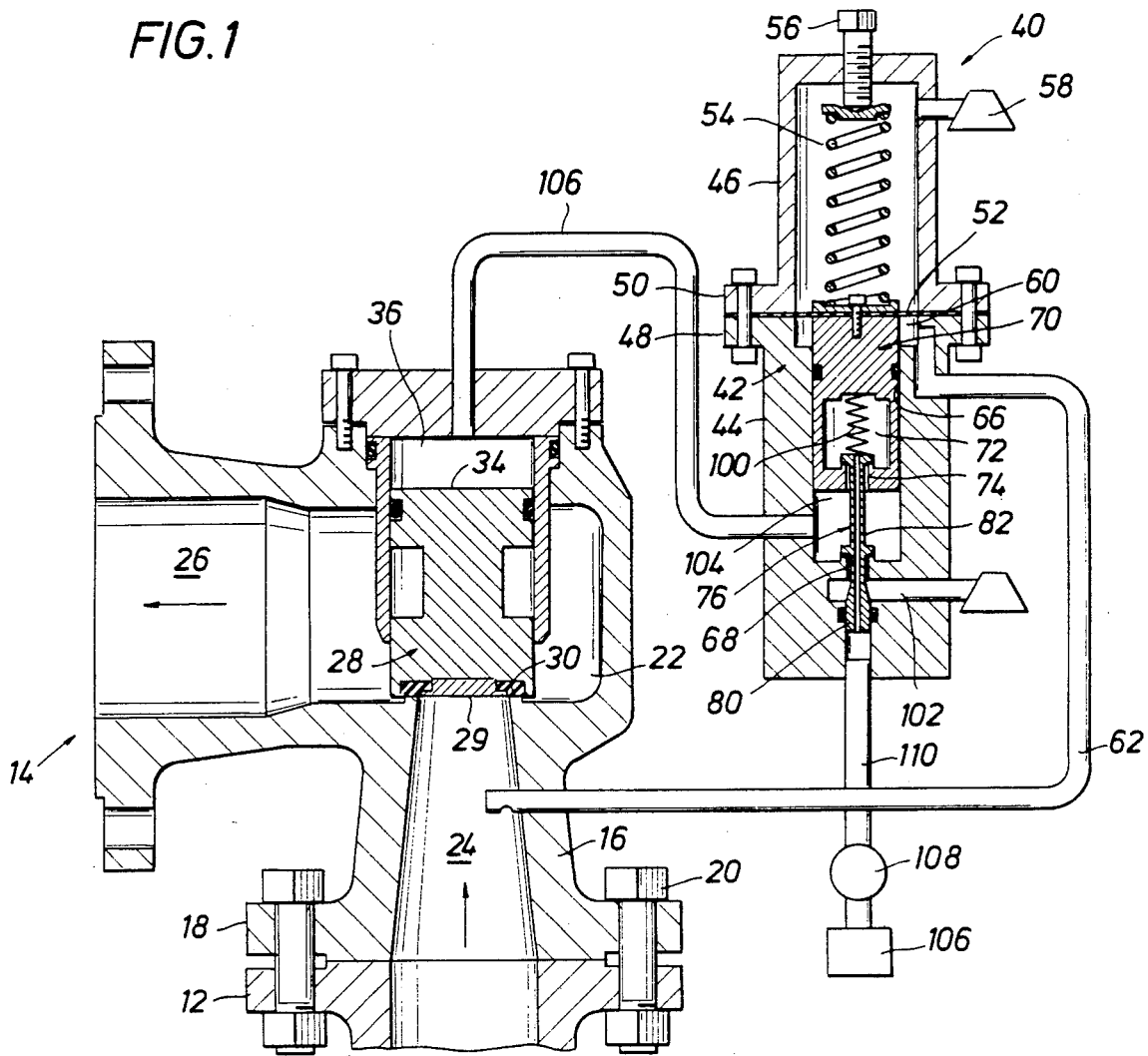
FIG. 1 is a cross sectional view, partly schematic, of a system for controlling a pressure relief valve in a main flow line and including the improved pilot valve of the present invention with a separate auxiliary fluid source.

Referring now to the drawings for a better understanding of this invention, and more particularly to FIG. 1 in which the safety system including the improved pilot valve of this invention is illustrated, a pressure vessel or tank is partially shown at 10 and has an outlet extending therefrom including an upper flange 12. A main pressure relief valve indicated generally at 14 has a valve body 16 including a lower flange 18 connected to flange 12 by suitable nut and bolt combinations indicated generally at 20.

Valve body 16 includes a valve chamber 22 with an inlet flow passage 24 and an outlet flow passage 26 communicating therewith. A piston type relief valve member shown generally at 28 is mounted within valve chamber 22 for reciprocable movement and has an inner face 29 forming a seat for seating against an annular seat 30 about inlet flow passage 24. Inner face 29 of valve member 28 is normally exposed to process fluid from inlet flow passage 24 and tank 10 and has a rear face 34 exposed to fluid pressure from a dome chamber 36. The area of inner face 29 exposed to fluid pressure from inlet flow passage 24 in closed position is less than the area of outer face 34 exposed to fluid pressure in dome chamber 36. Thus, a fluid pressure differential area is provided between faces 29 and 34 and a fluid pressure in dome chamber 36 lower than the fluid pressure in inlet flow passage 24 will maintain valve member 28 in seated position on seat 30.

The improved pilot valve forming the present invention is generally shown at 40 and has a valve body 42 defining a lower body portion 44 and an upper body portion 46. Lower body portion 44 has an upper flange 48 and upper body portion 46 has a lower flange 50 which clamp a sensing diaphragm 52 therebetween. A spring 54 urges diaphragm 52 downwardly and an adjusting screw 56 may be manually actuated to adjust the pressure exerted by spring 54. An exhaust to atmosphere for upper body portion 46 is provided at 58.

Lower body portion 44 defines a fluid inlet sensing chamber 60 adjacent sensing diaphragm 52 in fluid commmunication through sensing line 62 with inlet flow passage 24 containing process fluid. Thus, inlet sensing chamber 60 is exposed to process fluid from tank 10 at all times. Lower body portion 44 has a large diameter central bore portion 66 adjacent fluid sensing chamber 60 and a small diameter end bore portion 68 communicating with bore portion 66. A piston shown generally at 70 is secured to diaphragm 52 for movement therewith and is mounted for reciprocable movement within enlarged diameter bore portion 66. Piston 70 has a large diameter internal bore portion 72 forming a fluid inlet supply chamber and a small diameter entrance bore portion 74 communicating with large diameter internal bore portion 66.

Figure 2:
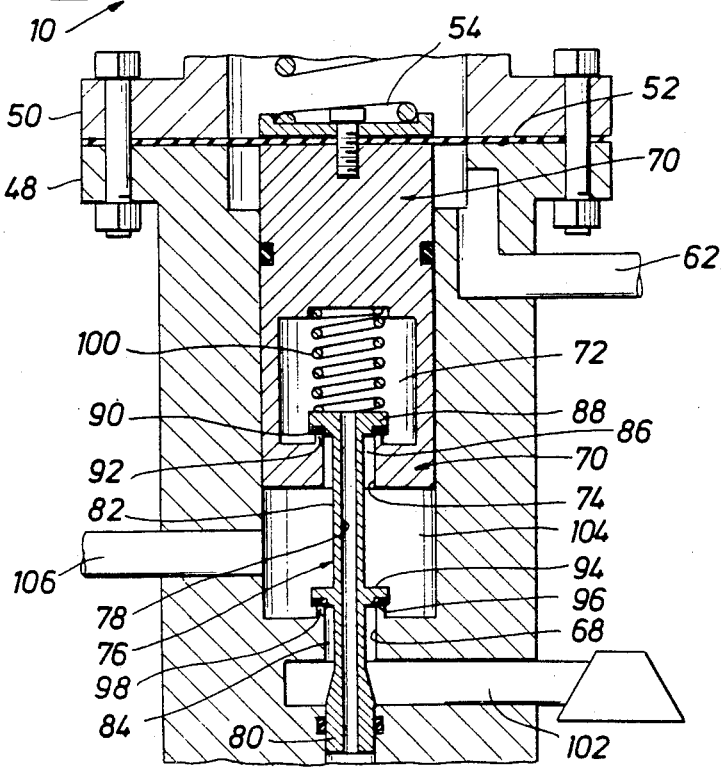
FIG. 2 is an enlarged fragment of the improved pilot valve of FIG. 1 showing the pilot valve in a normal operating condition with the spool valve member in seated position blocking fluid communication with the intermediate fluid chamber of the pilot valve and the dome chamber of the pressure relief valve.

A spool valve member shown generally at 76 has a central bore 78 extending therethrough and defines a large diameter lower end portion 80 and a reduced diameter portion 82 extending from end portion 80. End portion 8 fits within bore 68 and reduced diameter portion 82 fits within bore 68 and extends through small diameter entrance bore 74 of piston 70. An annular space 84 within bore 68 is provided about reduced diameter bore portion 82 and an annular space 86 within entrance bore 74 of piston 70 is provided about reduced diameter portion 82. Spool valve member 76 has an upper end flange 88 with an O-ring seal 90 about its inner surface adapted to seat on an annular seat 92 about small diameter bore portion 74. An intermediate flange 94 has an O-ring seal 96 about its inner surface adapted to seal on seat 98 extending about the upper end of bore 68. A relatively light spring 100 is biased between piston 70 and upper end flange 88 of spool valve member 76 to urge spool valve member 76 to a normal seated position as shown in FIG. 2 with O-ring 90 in seating engagement on seat 92 and O-ring 96 in seating engagement on seat 98. An exhaust fluid passage 102 extends from bore 68 through body portion 44 to atmosphere to provide a bleed or exhaust chamber.

As shown in the position of FIGS. 1 and 2 with O-rings 90 and 96 in seated position on respective seats 92 and 98, a fluid inlet supply chamber 72 is formed by the internal bore of piston 70, an intermediate fluid chamber 104 is formed in enlarged bore portion 66 adjacent piston 70 which is in continuous fluid communication with dome chamber 36 through dome line 106 from chamber 104 to dome chamber 36, and a fluid outlet chamber or exhaust chamber is formed by exhaust fluid passage 102 in bore portion 68 in fluid communication to atmosphere. To provide a clean supply of fluid to inlet chamber 72, intermediate chamber 104, and dome chamber 36, a source or supply of high pressure gas such as nitrogen, is provided at 106. A pressure reducing regulator 108 adjacent fluid source 106 provides a constant predetermined pressure through line 110 to central bore 78 of spool valve member 76 for the supply of gas to fluid inlet chamber 72. It is noted that the process fluid being sensed through line 62 and inlet sensing chamber 60 is completely isolated and separated from inlet chamber 72, intermediate chamber 104, dome chamber 36, and spool valve 76, and thus can not contaminate these areas. In the normal position of pilot valve 40 as shown in FIGS. 1 and 2, a fluid pressure differential area is provided within internal bore portion 72 defining the fluid inlet supply chamber and piston 70 is urged in an upward direction opposing the bias of spring 54.

In operation, with a constant pressure exerted by the process fluid in tank 10 against diaphragm 52 in sensing chamber 60, O-ring seals 90 and 96 on spool valve member 76 are seated on adjacent seats 92 and 98. In this position, intermediate fluid chamber 104 and dome chamber 36 are not in communication with fluid inlet chamber 72 or exhaust chamber 102. Upon an increase in the process fluid pressure in tank 10 and inlet sensing chamber 60 a predetermined amount, diaphragm 52 and piston 70 move upwardly to the position shown in FIG. 3 to place intermediate fluid chamber 104 in fluid communication with bore 68 and exhaust passage 102 to reduce the pressure in dome chamber 36. Upon exhaust of the auxiliary gas to atmosphere from exhaust chamber 102, the reduced pressure from the auxiliary gas supply acting against piston 70 causes movement of piston 70 downwardly under the bias of spring 54 for seating of seal 96 on seat 98. In the event the process fluid pressure increases again as sensed in sensing chamber 60, piston 70 again moves up to further de-pressurize dome chamber 36. When the pressure in dome chamber 36 decreases an amount so that the opposed forces acting against ends or faces 29 and 34 of unbalanced piston valve member 28 are generally equal, valve member 28 in unseated from seat 36 and opens to permit process pressure from inlet flow passage 24 to flow through valve 14 and outlet flow passage 26 for reducing the pressure in tank 10. If the flow is sufficient to prevent the fluid pressure of the process fluid from increasing, piston 70 will move downwardly under the bias of spring 54 to close the pilot outlet seat 98.

Figure 4:
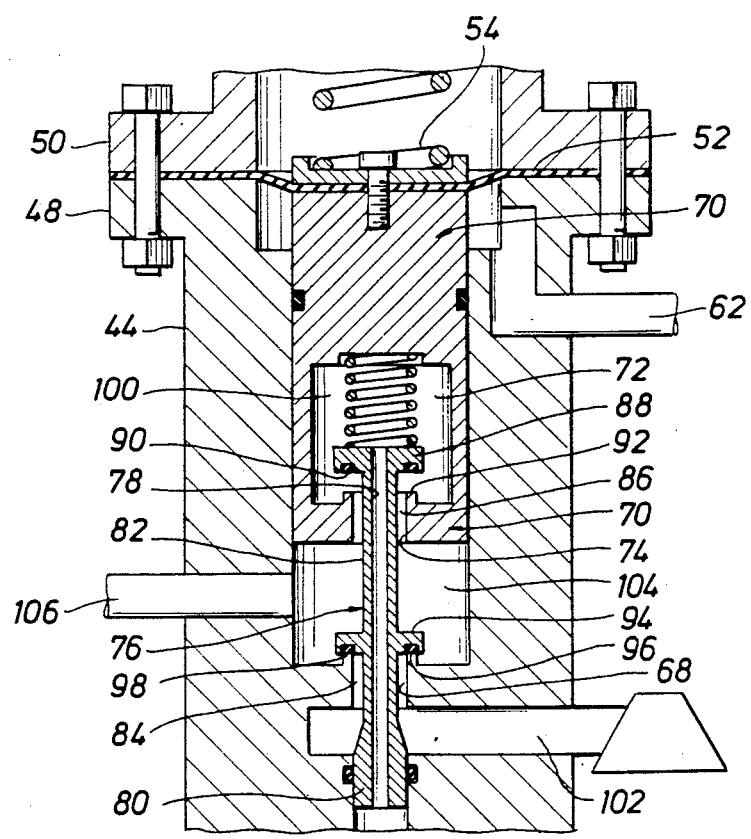
FIG. 4 is an enlarged fragment of the pilot valve similar to FIGS. 2 and 3 but showing the pilot valve exposed to a predetermined low process fluid pressure of the main flow line with the intermediate fluid chamber in fluid communication with the inlet fluid supply chamber for the auxiliary fluid source to supply auxiliary fluid to the dome chamber of the pressure relief valve for increasing the fluid pressure therein.

When the fluid pressure of the process fluid decreases in sensing chamber 60 below the set pressure point of pilot valve 40, piston 70 moves downwardly as shown in FIG. 4 to provide fluid communication between inlet chamber 72 and dome chamber 36 through line 106 and intermediate chamber 104 thereby to re-pressurize dome chamber 36. When the pressure in dome chamber 36 increases main valve 28 reseats and an increase in fluid pressure in inlet chamber 72 results in movement of piston 70 upwardly to effect seating of seal 90 on seat 92 thereby blocking fluid communication between inlet chamber 72 and dome chamber 36. It is noted that seal 96 is seated on seat 98 at all times except when the fluid pressure of the process fluid reaches a predetermined high amount in sensing chamber 60. Thus, only a small amount of the supply fluid from fluid source 106 is leaked to atmosphere from exhaust passage 102.

Figure 3:
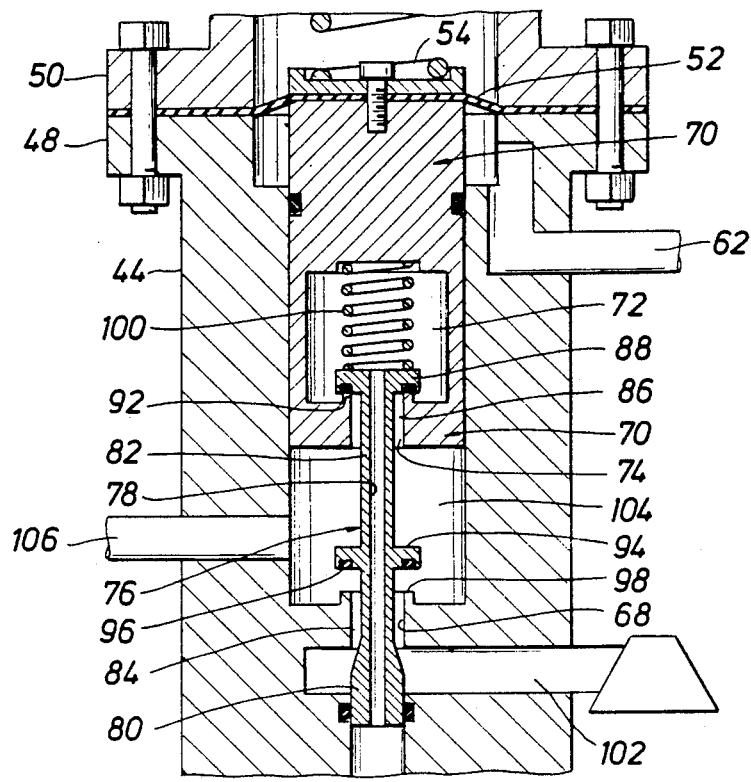
FIG. 3 is an enlarged fragment of the pilot valve similar to FIG. 2 but showing the pilot valve exposed to a predetermined high process fluid pressure of the main flow line with the intermediate fluid chamber and the dome chamber of the pressure relief valve in fluid communication to atmosphere to reduce the fluid pressure in said dome chamber.

As a specific example, adjustment of pilot valve 40 is made (1) to provide an opening of spool valve member 76 as shown in FIG. 3 at a process fluid pressure in sensing chamber 70 above 95% of the set pressure determined by adjustment screw 56, (2) to provide an opening of spool valve member 76 as shown in FIG. 4 at a process fluid pressure in sensing chamber 60 below 92% of the set pressure, and (3) to permit spool valve member 76 to remain in a seated position as shown in FIG. 2 when the process fluid pressure in sensing chamber 60 is between 92% and 95% of the set pressure. Thus, when the fluid pressure in sensing chamber 60 is below 92% of the set pressure, piston 70 moves downwardly to unseat spool valve member 76 and permit the supply of clean inlet gas to dome chamber 36 through intermediate fluid chamber 104. When the process fluid pressure in sensing chamber 60 increases to 92% of the set pressure, diaphragm 52 and piston 70 are moved upwardly to effect reseating of O-ring seal 90 on seat 92 thereby blocking fluid flow between dome chamber 36 and inlet chamber 72.

In the event fluid pressure of the process fluid increases above 95% of the set pressure, diaphragm 52 and piston 70 move upwardly to unseat spool valve member 76 from seat 98 for exhausting fluid pressure in dome chamber 36 to atmosphere through passage 102. If the process pressure then ceases to increase, piston 70 will move downwardly as a result of the lower dome pressure in chamber 36. In the event fluid process pressure again increases, piston 70 again moves upwardly for unseating of spool valve member 76 from seat 98 to further de-pressurize dome chamber 36. When the dome pressure in chamber 36 decreases to an amount so that fluid pressure acting on opposed faces 29 and 34 of main valve member 28 are generally equal, valve member 28 moves upwardly for relief of process fluid through outlet passage 26. If the flow is sufficient to keep the process fluid in sensing chamber 60 from increasing, piston 70 moves downwardly for reseating of spool valve member 76 on seat 98. When the process fluid pressure in sensing chamber 690 decreases below 92% of set point pressure, piston 70 moves downwardly as shown in FIG. 4 and dome chamber 36 is repressurized by the flow of fluid from inlet supply chamber 72 to dome chamber 36. When the dome pressure in dome chamber 36 increases a predetermined amount, piston 70 moves upwardly for reseating of O-ring seal 90 on seat 92.

As a result of the utilization of a separate auxiliary high pressure fluid, such as nitrogen gas, of the operation of pilot valve 40, spool valve member 76 and dome chamber 36 remain isolated from any process fluid thereby preventing any contamination or malfunctioning thereof resulting form dirty process fluids containing foreign matter. Pilot valve 40 is a non-flowing pilot valve and does not have a continuous fluid flow therethrough during normal operating position. Thus, a very small amount of the auxiliary fluid is exhausted to atmosphere as this occurs only during a drop in fluid pressure of the process fluid below a predetermined amount as shown in FIG. 3. Further, int he event regulator 108 develops a leak such as at a seat or the like and pressurizes dome chamber 36 to a pressure above 92% of the set pressure, the set pressure will decrease as a result of the fluid pressure differential area in inlet chamber 72 acting on piston 70 to overcome the downward force o the adjustment spring 54 so that dome chamber 36 is not exhausted to atmosphere as shown in FIG. 3. A fluid pressure for the auxiliary gas up to around 5,000 psi may be provided by the utilization of constant pressure regulator 108 thereby to minimize replenishment of the gas supply in source 106.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a safety relief system for a pressure vessel having a safety relief valve in a main flow line from the pressure vessel, the safety relief valve including reciprocable piston the valve member mounted in the flow line in a normally closed position and a dome chamber against an outer end of the reciprocable valve member;

a pilot valve connected to the relief valve to control operation thereof including an elongate body having a central bore therein defining a fluid inlet sensing chamber for sensing process fluid from the main flow bore, a fluid inlet supply chamber for receiving a separate auxliary fluid supply isolated from said process fluid, an intermediate fluid chamber isolated from said process fluid in fluid communication with said dome chamber and adapted to be in selected fluid communication with said fluid inlet supply chamber, and an exhaust fluid chamber to atmosphere adapted to be in selected fluid communication with said intermediate fluid chamber;

an elongate spool valve for blocking fluid communication between said intermediate fluid chamber and said fluid inlet supply and exhaust chambers during normal operation of said control valve;

a diaphragm exposed to process fluid in said fluid inlet sensing chamber responsive to pressure changes in said process fluid in said main flow line;

a piston mounted within said central bore and connected to said diaphragm for movement therewith, said piston having an internal bore forming said fluid inlet supply chamber;

a first valve seat between said intermediate fluid chamber and said piston internal bore forming said fluid inlet supply chamber; and a second valve seat between said intermediate fluid chamber and said exhaust chamber;

said spool valve having a pair of spaced seals thereon adapted to seat on said valve seats for blocking fluid flow thereat;

said spool valve responsive to said fluid sensing member for unseating from said second valve seat to permit fluid communication between said intermediate fluid chamber and said exhaust chamber upon the reaching of a predetermined high pressure in said process fluid for reducing fluid pressure in said dome chamber, and for unseating from first valve seat to permit fluid communication between said intermediate fluid chamber and said fluid inlet supply chamber upon the reaching of a predetermined low pressure in said process fluid for pressurizing said dome chamber for the auxiliary fluid supply, said spool valve extending within said internal bore of said piston;

means urging said spool valve into seated position on said first valve seat; and an auxiliary fluid source and a pressure regulator to supply an auxiliary fluid to said fluid inlet chamber at a predetermined constant fluid pressure.

2. In a safety relief system as set forth in claim 1, said means urging said spool valve into seated position on said first valve seat comprising resilient spring within said piston internal bore biased between said piston and an adjacent end of said spool valve.

3. In a safety relief system as set forth in claim 2, said elongate spool valve having a central bore therethrough along its longitudinal axis for providing continuous fluid communication from said auxiliary fluid source to said fluid inlet supply chamber in said internal bore of said piston.

4. An improved pilot valve adapted to be in fluid communication with a dome chamber of control valve in a main flow line for a process fluid; said improved pilot valve comprising:

an elongate body having a central bore therein defining a fluid inlet sensing chamber for sensing process fluid from the main flow bore, a fluid inlet supply chamber isolated from said process fluid for receiving a separate auxiliary fluid supply, an intermediate fluid chamber isolated from said process fluid in fluid communication with said dome chamber and adapted to be in selected fluid communication with said d fluid inlet supply chamber, and an exhaust fluid chamber to atmosphere adapted to be in selected fluid communication with said intermediate fluid chamber;

an elongate spool valve for blocking fluid communication between said intermediate fluid chamber and said fluid inlet supply and exhaust chambers during normal operation of said control valve, said elongate spool valve having a central bore therethorugh along its longitudinal axis for providing continuous fluid communication from said auxiliary fluid source to said fluid inlet supply chamber;

a diaphragm isolated from said auxiliary fluid source exposed to process fluid in said fluid inlet sensing chamber responsive to pressure changes in said process fluid in said main flow line;

a piston mounted within said central bore and connected to said diaphragm for movement therewith, said piston having an internal bore forming said fluid inlet supply chamber;

a first valve seat between said intermediate fluid chamber and said piston internal bore forming said fluid inlet supply chamber;

a second valve seat between said intermediate fluid chamber and said exhaust chamber;

said spool valve having a pair of spaced seals thereon adapted to seat on said valve seats for blocking fluid flow threat;

said spool valve responsive to said fluid sensing member for unseating from said second valve seat to permit fluid communication between said intermediate fluid chamber and said exhaust chamber upon the reaching of a predetermined high pressure in said process fluid for reducing fluid pressure in said dome chamber, and for unseating from first valve seat to permit fluid communication between said intermediate fluid chamber and said fluid inlet supply chamber upon the reaching of a predetermined low pressure in said process fluid for pressurizing said dome chamber from the auxiliary fluid supply, said spool valve extending within said internal bore of said piston; and resilient spring means within said piston internal bore for urging said spool valve into seated position on said first valve seat.

* * * * *